(12) United States Patent
Xing et al.

(10) Patent No.: US 9,116,739 B2
(45) Date of Patent: Aug. 25, 2015

(54) FAST AND SCALABLE CONCURRENT QUEUING SYSTEM

(71) Applicant: Intel Corporation, Santa Clara, CA (US)

(72) Inventors: Bin Xing, Hillsboro, OR (US); Juan B. Del Cuvillo, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 13/829,214

(22) Filed: Mar. 14, 2013

(65) Prior Publication Data

US 2014/0282562 A1 Sep. 18, 2014

(51) Int. Cl.
*G06F 9/46* (2006.01)
*G06F 9/48* (2006.01)

(52) U.S. Cl.
CPC ............... *G06F 9/46* (2013.01); *G06F 9/4881* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 7,447,875 B1 | 11/2008 | Henriksen | |
| 2003/0023786 A1 | 1/2003 | Craddock et al. | |
| 2005/0066082 A1 * | 3/2005 | Forin et al. | 710/52 |
| 2007/0276973 A1 | 11/2007 | Tan et al. | |
| 2008/0066066 A1 | 3/2008 | MacPherson | |

OTHER PUBLICATIONS

International Search Report and Written Opinion received for PCT Patent Application No. PCT/US2014/019249, mailed on Jun. 27, 2014, 11 pages.
Stone, "A Simple and Correct Shared-Queue Algorithm Using Compare-and-Swap", IBM T.J. Watson Research Center.
Michae et al., "Simple, Fast and Practical Non-Blocking and Blocking Concurrent Queue Algorithms", Department of Computer Science, University of Rochester.

* cited by examiner

*Primary Examiner* — Camquy Truong
(74) *Attorney, Agent, or Firm* — Grossman, Tucker, Perreault & Pfleger, PLLC

(57) ABSTRACT

This disclosure is directed to a fast and scalable concurrent queuing system. A device may comprise, for example, at least a memory module and a processing module. The memory module may be to store a queue comprising at least a head and a tail. The processing module may be to execute at least one thread desiring to enqueue at least one new node to the queue, enqueue the at least one new node to the queue, a first state being observed based on information in the tail identifying a predecessor node when the at least one new node is enqueued, observe a second state based on the predecessor node, determine if the predecessor node has changed based on comparing the first state to the second state, and set ordering in the queue based on the determination.

21 Claims, 11 Drawing Sheets

FIG. 7

```
template <class T>
bool CAS(T *dest, T *cmp_val, T set_val) {
    if (*dest == *cmp_val) {
        *dest = set_val;
        return true;
    } else {
        *cmp_val = *dest;
        return false;
    }
} template <class T>
T XCHG(T *dest, T src) {
    T temp = *dest;
    *dest = src;
    return temp;
}

// Data structure definitions
typedef struct __Node_T {
    struct __Node_T *pointer;
    size_t counter;
} Node_T;

typedef struct __Q_T {
    Node_T tail;
    Node_T head;
} Q_T;

// Initialization of Q
void InitializeQueue(Q_T *q) {
    q->head.pointer = q->tail.pointer = &q->tail;
}
```

```
// Per-Node counter version of Enqueue void Enqueue(Q_T *q, Node_T *Node) {
    Node->counter++;
    Node->pointer = &q->tail;
    Node_T temp = XCHG(&q->tail, Node_T(Node, Node->counter));

Node_T* pred = temp.pointer; // predecessor address
    temp.pointer = &q->tail;
    If (!CAS(pred, &temp, Node_T(Node, temp.counter))) {
        // Node is head of q
        q->head.pointer = Node;
    }
}
```

```
// Dequeue

Node_T *Dequeue(Q_T *q) {
    Node_T head, new_head;
    head = q->head; // read both pointer and counter
    do {
        if (head.pointer == &q->tail) { // this isn't a dereference of q->tail
            return NULL;
        }
        new_head.pointer = head.pointer->pointer;
        new_head.counter = head.counter + 1;
    } while (!CAS(&q->head, &head, new_head));
    if (new_head.pointer == &q->tail) {
        new_head.pointer = XCHG(&head.pointer->pointer, NULL);
        if (new_head.pointer != &q->tail)
            q->head.pointer = new_head.pointer;
    }
    return head.pointer;
}
```

900

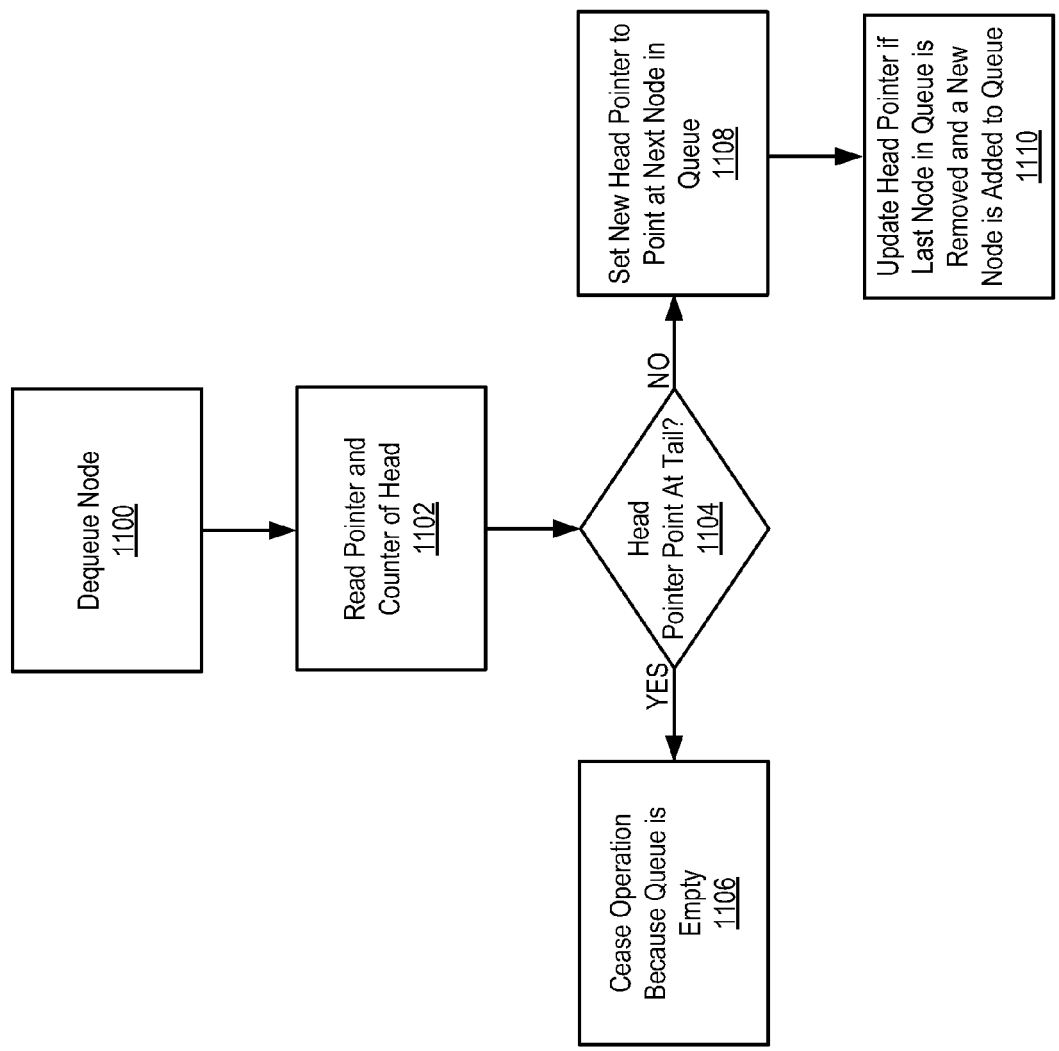

FAST AND SCALABLE CONCURRENT QUEUING SYSTEM

TECHNICAL FIELD

The present disclosure relates to data processing, and more particularly, to systems for enqueuing and dequeuing data in a manner that provides traceability for possible data changes.

BACKGROUND

In data processing, the manner in which a data processing device may place information into a data processing queue (e.g., enqueuing) and remove information from the data processing queue (e.g., dequeuing) may have a substantial impact on the maximum speed at which the data processing device may operate. The concurrent queuing of data permits a plurality of processor threads (e.g., a sequence of programmed instructions executed by the data processor) to enqueue and dequeue information from the same processing queue at substantially the same time. While the ability to process data in this manner allows for multiple queue operations to be performed in parallel, and thus for data to be processed more quickly, it is not without some inherent issues.

For example, at least one issue in existing concurrent queuing schemes is the "A-B-A" problem. An example A-B-A problem scenario initiates with a particular data processing queue location (e.g., node) containing a value "A" when first read by a data processing device. While the value of the node may subsequently change (e.g., to "B"), it may still appear to be "A" (or may even change back to "A") when the transition goes unnoticed by the data processing device. For example, a node may be removed from the queue, deleted, and then replaced by a new node that appears to be original node, which may occur frequently in concurrent queuing. This quick transition may occur because, as stated above, threads in concurrent queuing may enqueue and dequeue nodes at substantially the same time. Not being aware of changes in the data processing queue may result in, for example, errors, corrupted data processing results, delays in receiving data processing results due to the need to reprocess, etc. Thus, any increases in speed that may be realized from concurrent queuing may be decreased or even nullified by the overall negative impact in performance due to the A-B-A problem and/or other similar processing-related issues.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 7 illustrates example pseudo-code for declaring functions and structures in accordance with at least one embodiment of the present disclosure;

FIG. 8 illustrates example pseudo-code for a node-counter-based enqueue function in accordance with at least one embodiment of the present disclosure;

FIG. 9 illustrates example pseudo-code for a dequeue function in accordance with at least one embodiment of the present disclosure;

FIG. 11 illustrates example operations for dequeuing in a fast and scalable concurrent queuing system in accordance with at least one embodiment of the present disclosure.

Figure 1:
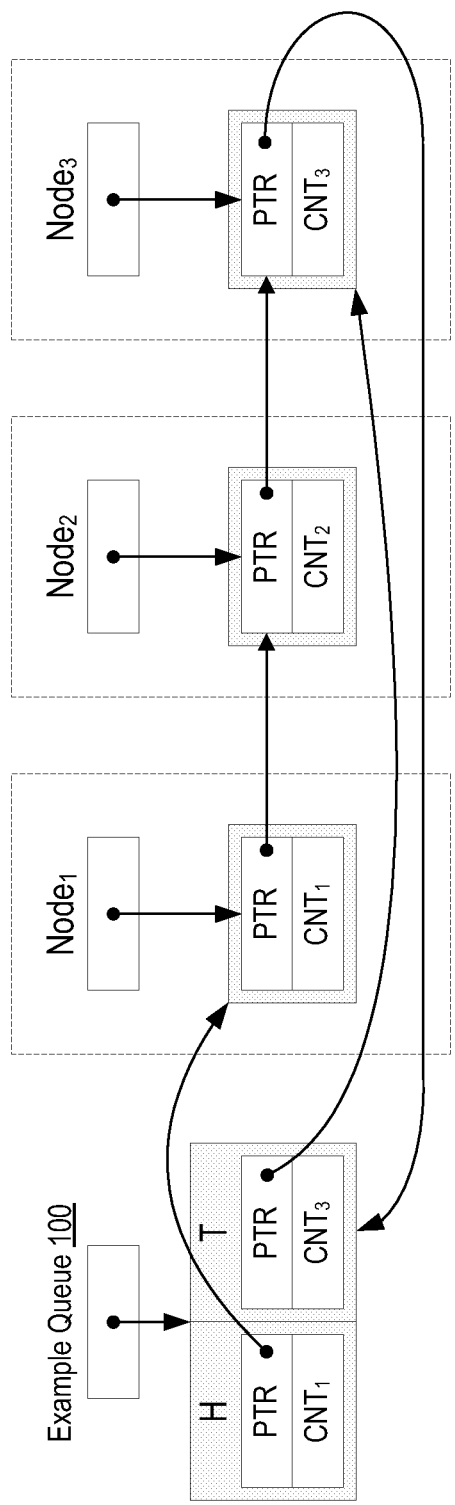
FIG. 1 illustrates an example fast and scalable concurrent queuing system in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a fast and scalable concurrent queuing system. In general, a queue in a device may include at least a head and a tail and possibly one or more nodes, wherein the head, tail and nodes include at least a pointer and a node-counter. When a thread desires to add a node to the queue, two observations may be made with respect to the state of a predecessor node of the newly-added node. State, as referenced herein, may pertain to the values of variables (e.g., pointer addresses, counter values, etc.) in a node, or at least associated with the node, at the time an observation is made. A first observation may be made while adding the new node and a second observation may be made after the new node is added. A determination may then be made, based on the two observations, as to whether the predecessor node has changed (e.g., been dequeued) after adding the new node to the queue. If it is determined that the predecessor node has changed, then the head pointer may be set to point to the new node. If it is determined that the predecessor has not changed, the pointer of the predecessor may be updated to point to the new node. An example dequeuing function may include updating the head address to point to the next node in the queue if it is determined that the queue contains at least one other node.

In one embodiment there is a device comprising, for example, at least a memory module and a processing module. The memory module may be to store a queue comprising at least a head and a tail. The processing module may be to execute at least one thread desiring to enqueue at least one new node to the queue, enqueue the at least one new node to the queue, a first state being observed based on information in the tail identifying a predecessor node when the at least one new node is enqueued, observe a second state based on the predecessor node, determine if the predecessor node has changed based on comparing the first state to the second state, and set ordering in the queue based on the determination.

In the same or a different embodiment, the head, tail and at least one new node may each comprise, for example, at least a pointer and a one-bit node counter. For example, the head pointer may include the address of a node situated first in the queue, the tail pointer including the address of a node situated last in the queue and the at least one new node pointer including the address of a node situated after the at least one new node in the queue. The processing module may then be to increment the node counter of the at least one new node and to set the pointer of the at least one new node to the tail address. In one embodiment, in observing the first state the processing module may be to set the pointer and node counter in a temporary node equal to the tail pointer and tail node counter. The processing module may then be to set a predecessor address associated with the at least one new node to the node indicated by the temporary node pointer.

In determining if the predecessor has changed, the processing module may be to compare at least the node pointer and node counter of the predecessor node to the node pointer and node counter of the temporary node. In setting ordering in the queue the processing module may be to set the head pointer to the address of the at least one new node if it is determined that the node pointer and node counter for the predecessor node are different than the node pointer and node counter for the temporary node. Alternatively, if it is determined that the node pointer and node counter for the predecessor node are the same as the node pointer and node counter for the temporary node, in setting ordering in the queue the processing module may be to set the pointer of the predecessor node to the address of the at least one new node. In at least one embodiment the comparison and subsequent order-setting operations may be performed as single/atomic operations.

In the same or a different embodiment, the processing module may further be to execute at least one thread desiring to dequeue a node from the queue, read the head pointer and head node counter, determine if the head pointer is pointing at the tail, set a new head pointer to point at the next node in the queue if it is determined that the head is not pointing at the tail, set the address of the head pointer equal to the address of the new head pointer, and take corrective action if the head pointer is pointing at the tail. An example method consistent with embodiments of the present disclosure may include executing at least one thread desiring to enqueue at least one new node to a queue including at least a head and a tail, the head, tail and at least one new node each comprising at least a pointer and a one-bit node counter, the head pointer including the address of a node situated first in the queue, the tail pointer including the address of a node situated last in the queue, and the at least one new node pointer including the address of the tail, enqueue the at least one new node to the queue, a first state being observed based on information in the tail identifying a predecessor node when the at least one new node is enqueued, observe a second state based on the predecessor node, determine if the predecessor node has changed based on comparing the first state to the second state, and set ordering in the queue based on the determination.

FIG. 1 illustrates an example fast and scalable concurrent queuing system in accordance with at least one embodiment of the present disclosure. Example queue 100 may include head "H", tail "T" and at least one node (e.g., Nodes$_{1-3}$). Nodes may be added (e.g., enqueued) to the end of queue 100 identified by tail T and may be removed (e.g., dequeued) from the top of queue 100 identified by head H in a first-in-first-out (FIFO) manner. Head H, tail T and Nodes$_{1-3}$ may include at least pointer "PTR" and counter "CNT". PTRs may point to memory locations. To perform this function, each PTR may store the address of the memory location to which it points. For example, as shown in FIG. 1 the PTR of head H may point to (e.g., may include the address of) the first node in queue 100 (e.g., Node$_1$), the PTR of tail T may point to (e.g., may include the address of) the last node in queue 100 (e.g., Node$_3$), and the PTR of each node may point to the node succeeding it in queue 100 (e.g., Node$_1$ PTR may include the address of Node$_2$, Node$_2$ PTR may include the address of Node$_3$ and Node$_3$ PTR may include the address of tail T that indicates the end of queue 100). The CNT of each node may count the number of times the node has changed (e.g., been dequeued). In one embodiment, the CTR may be a one-bit counter (e.g., counting 0, 1, 0, 1, etc.) because only an indication of change is needed, not an actual count of how many times a node has changed. By using only a one bit counter, actual code implementation may use single size data operations, such as single size compare-and-switch (CAS) or exchange (XCHG) operations, instead of double-size operations needed for larger-sized counters. The use of single-size data operations in enqueue and dequeue functions allows for less memory usage and faster execution. It is important to note that, while example queue 100 may serve as a basis by which various embodiments of the present disclosure may be explained, that implementations consistent with the present disclosure are not limited only to the disclosed configuration. For example, possible configurations may include more/less nodes, other pointers, counters or other node elements, etc.

Figure 2:
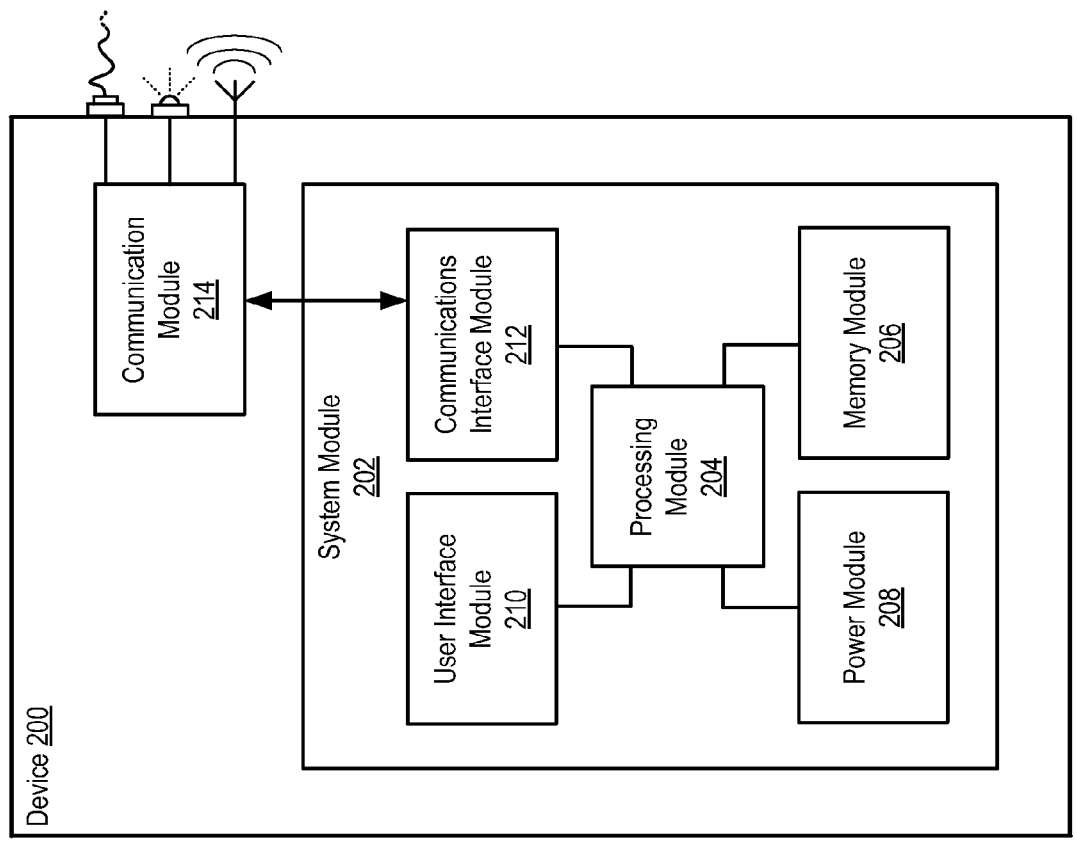
FIG. 2 illustrates an example configuration for a device usable in accordance with at least one embodiment of the present disclosure.

FIG. 2 illustrates an example configuration for device 200 usable in accordance with at least one embodiment of the present disclosure. More specifically, device 200 may be usable in relation to the example elements, structures and/or functionalities that were disclosed in FIG. 1. However, it is also important to note that device 200 is meant only as an example of equipment that may be employed in accordance with embodiments consistent with the present disclosure, and is not meant to limit any of these embodiments to a particular manner of implementation. Moreover, while example device 200 may be described as comprising a variety of functional modules, not all of the functional modules described herein may be necessary to implement the various embodiments of the present disclosure, and thus their inclusion may be deemed optional.

Device 200 may comprise system module 202 configured to manage device operations. System module 202 may include, for example, processing module 204, memory module 206, power module 208, user interface module 210 and communication interface module 212 that may be configured to interact with communication module 214. While communication module 214 has been illustrated as separate from system module 200, this configuration is merely for the sake of explanation herein. It is also possible for some or all of the functionality associated with communication module 214 may also be incorporated within system module 200.

In device 200, processing module 204 may comprise one or more processors situated in separate components, or alternatively, may comprise one or more processing cores embodied in a single component (e.g., a multi-core configuration component comprising multiple one or more processing cores) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 204 may interact with other system components that may be operating at different speeds, on different buses, etc. in device 200. Some or all of the functionality commonly associated with the support circuitry may also be included in the same physical package as the processor (e.g., a System-on-Chip (SoC) package like the Sandy Bridge integrated circuit available from the Intel Corporation).

Processing module 204 may be configured to execute various instructions in device 200. Instructions may include program code configured to cause processing module 204 to perform activities related to reading data, writing data, processing data, formulating data, converting data, transforming data, etc. Information (e.g., instructions, data, etc.) may be stored in memory module 206. Memory module 206 may comprise random access memory (RAM) or read-only memory (ROM) in a fixed or removable format. RAM may include memory configured to hold information during the operation of device 200 such as, for example, static RAM (SRAM) or Dynamic RAM (DRAM). ROM may include memories such as bios memory configured to provide instructions when device 200 activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc.

Power module 208 may include internal power sources (e.g., a battery) and/or external power sources (e.g., electromechanical or solar generator, power grid, fuel cell, etc.), and related circuitry configured to supply device 200 with the power needed to operate. User interface module 210 may include circuitry configured to allow users to interact with device 200 such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 212 may be configured to handle packet routing and other control functions for communication module 214, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 212 may be configured to prevent wireless communications that are active in communication module 214 from interfering with each other. In performing this function, communication interface module 212 may schedule activities for communication module 214 based on, for example, the relative priority of messages awaiting transmission.

As operations related to queue 100 may occur at a somewhat low level within device 200, in some embodiments consistent with the present disclosure only processing module 204 and/or memory 206 may be active. For example, memory module 206 may comprise various memory locations corresponding to the nodes in queue 100. Threads executed by processing module 204 may then proceed to enqueue or dequeue nodes in queue 100 as will be described in FIGS. 3 to 5.

Figure 3:
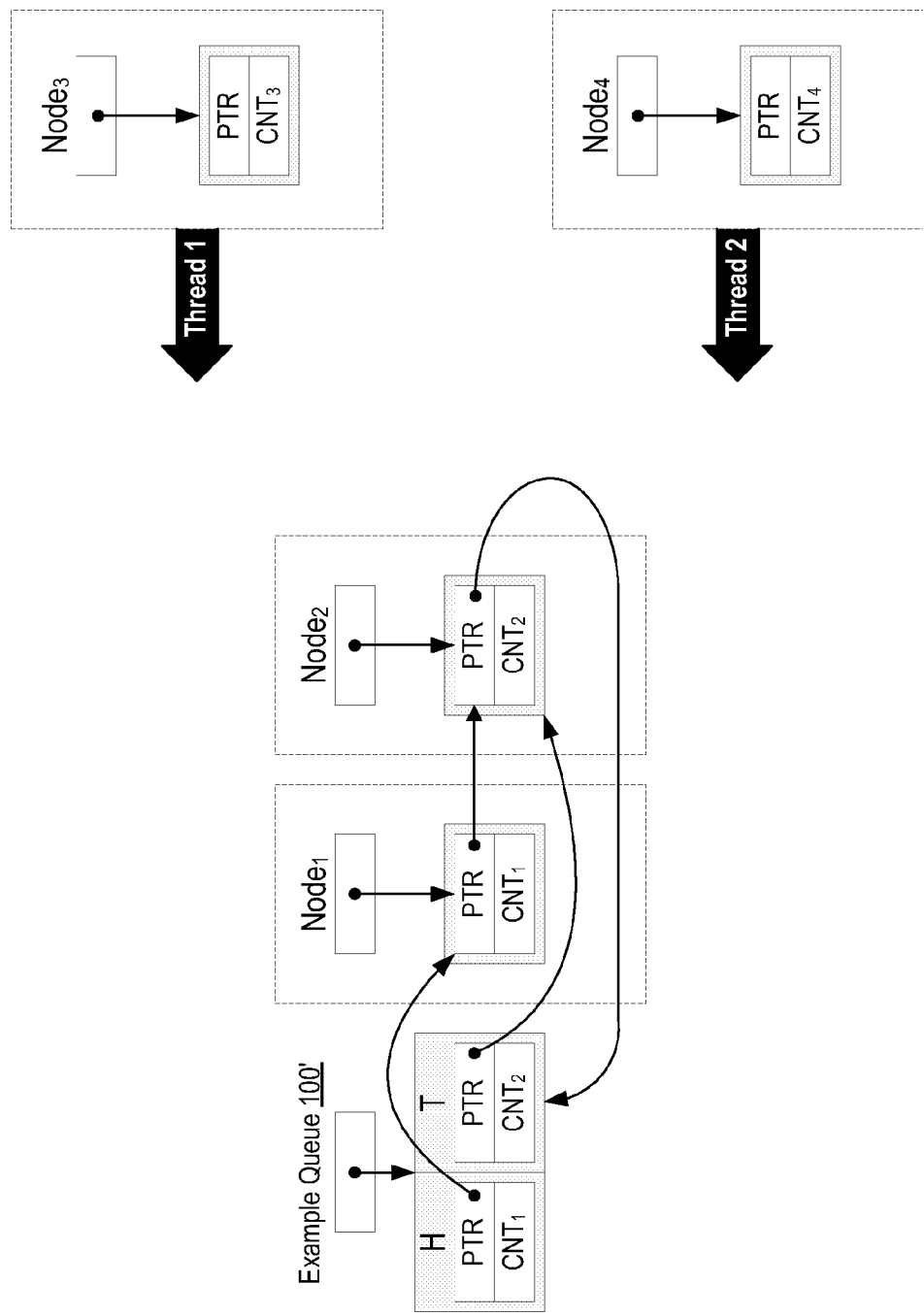
FIG. 3 illustrates an example wherein a first thread and a second thread desire to enqueue a node in a queue in accordance with at least one embodiment of the present disclosure.

FIG. 3 illustrates an example wherein a first thread and a second thread desire to enqueue a node in a queue in accordance with at least one embodiment of the present disclosure. FIGS. 3 to 6 describe an example progression by which at least one node may be added to queue 100'. In the example of FIG. 3, queue 100' may already comprise $Node_1$ and $Node_2$. First thread (thread 1) and second thread (thread 2) may each desire to enqueue $Node_3$ and $Node_4$, respectively. As previously described, head H, tail T and $Nodes_{1-4}$ may each include at least a PTR and a CNT.

Figure 4:
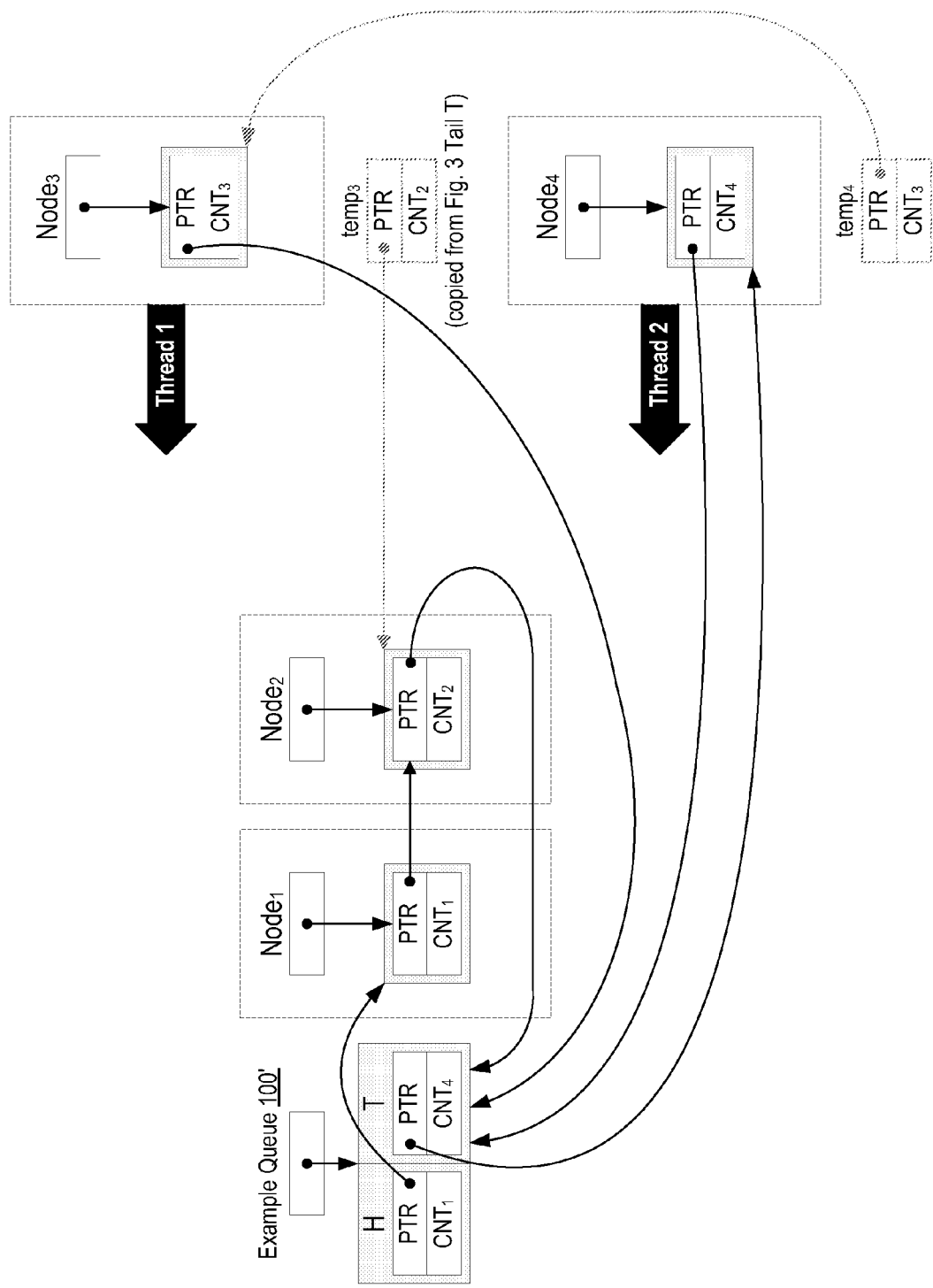
FIG. 4 illustrates an example wherein both the first thread and the second thread attempt to enqueue a node in the queue in accordance with at least one embodiment of the present disclosure.

FIG. 4 illustrates an example wherein both thread 1 and thread 2 attempt to enqueue a node in queue 100' in accordance with at least one embodiment of the present disclosure. For example, Node3 and Node4 may each generate a temporary program structure (e.g., $temp_3$ and $temp_4$) configured to read PTR and CNT settings from tail T. The settings are copied from tail T because tail T current points to the end of queue 100', which is where new nodes are added. In the example of FIG. 4, thread 1 is able to act first and receives the current settings of tail T (e.g., the address and CNT of $Node_2$). As a new node is added to queue 100', the PTR and CNT of tail T will be updated to reflect the value of the recently added node. Thus, when an attempt is later made by thread 2 to add $Node_4$ the information copied into $temp_4$ reflects that tail T was pointing to $Node_3$ (e.g., PTR includes the address and CNT of $Node_3$). Tail T is then be updated to reflect that an attempt is being made to add $Node_4$ (e.g., PTR and CNT include the address and CNT of $Node_4$). The PTR of $Node_3$ and $Node_4$ may be set to point at tail T and their CNT may be incremented when these nodes are added to queue 100'.

Figure 5:
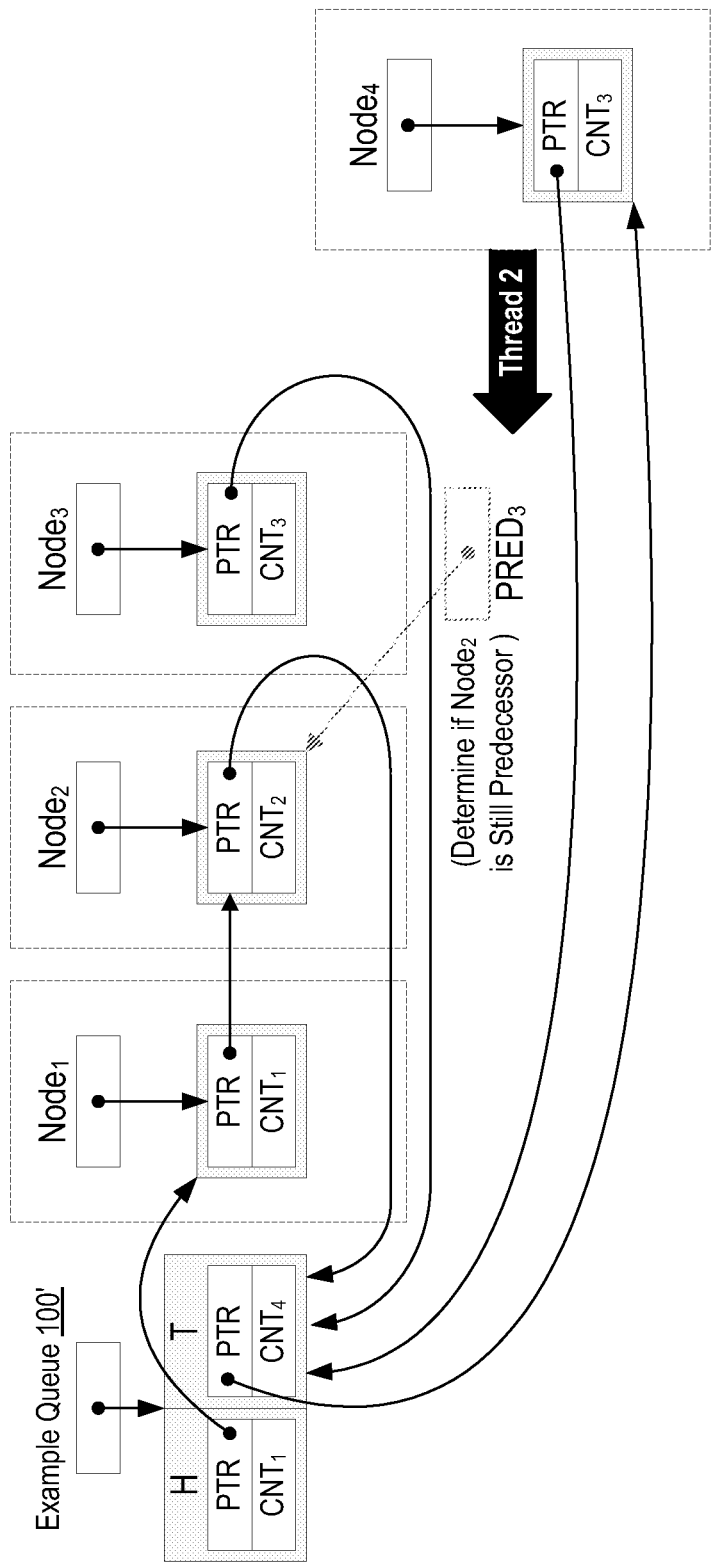
FIG. 5 illustrates an example wherein the first thread verifies the predecessor node is still queued in accordance with at least one embodiment of the present disclosure.

FIG. 5 illustrates an example wherein the first thread verifies the predecessor node is still queued in accordance with at least one embodiment of the present disclosure. A determination may first be made as to whether $Node_2$ is still the predecessor of $Node_3$ (e.g., that $Node_2$ has not been dequeued). For example, at least the value of PTR and $CNT_2$ in $Node_2$ may be compared to the value of PTR and $CNT_2$ that was previously saved in $temp_3$ (e.g., that was obtained from tail T as illustrated in FIG. 4) to determine if the PTR and $CNT_2$ in $Node_2$ has changed. If it is determined that the values of PTR and $CNT_2$ in $Node_2$ have not changed, then $PRED_3$ associated with $Node_3$ (e.g., a temporary variable used to hold the address corresponding to the node preceding $Node_3$) may be set to point to $Node_2$ as shown in FIG. 5. Otherwise, if it is determined that the values of PTR and $CNT_2$ in $Node_2$ are not equal to the values of PTR and $CNT_2$ in $temp_3$ then $Node_2$ has been dequeued. Since in FIFO nodes may only be dequeued from the top of queue 100', newly added $Node_3$ must be at the top of queue 100'. Thus, the address in the PTR of head H may then be updated to reflect that $Node_3$ is now at the top of queue 100'.

Figure 6:
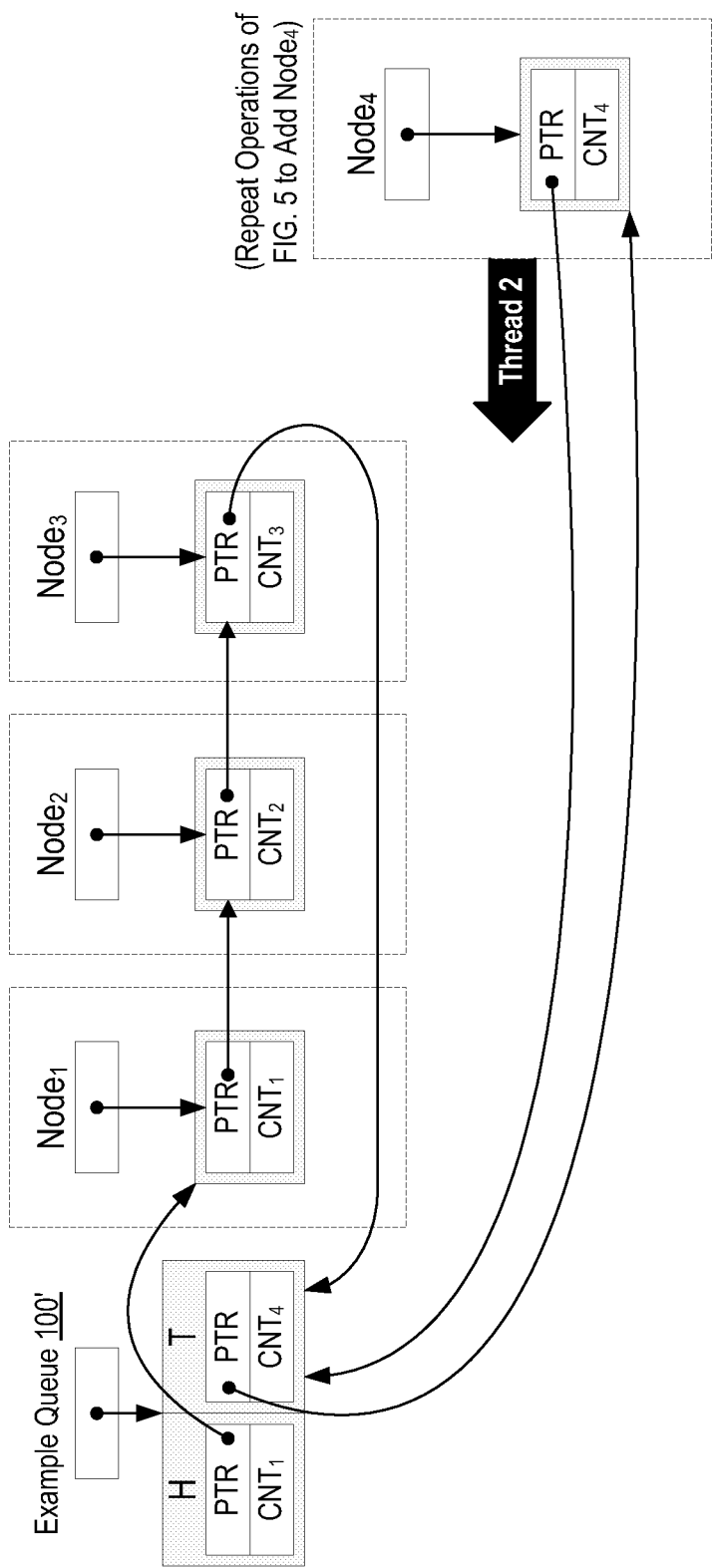
FIG. 6 illustrates an example wherein the first thread completes enqueuing the node to the queue in accordance with at least one embodiment of the present disclosure.

FIG. 6 illustrates an example wherein the first thread completes enqueuing the node to the queue in accordance with at least one embodiment of the present disclosure. For example, the PTR in $Node_3$ may be set to point to tail T in queue 100'. At this instance $Node_3$ is fully integrated into queue 100' in that all PTRs have been set to indicate the appropriate predecessor node and following members in queue 100'. However, tail T still includes the address of $Node_4$, which may also be enqueued into queue 100' in, for example, the same manner such as already set forth in FIG. 5 in regard to the integration of $Node_3$. In at least one embodiment the comparison and subsequent order-setting operations of FIGS. 5 and 6 may be performed as single/atomic operations.

The pseudo-code disclosed in FIG. 7-9 presents a programmatic example of how needed functions and structures may be defined, how an example node-counter-based enqueue function may operate and how a dequeue function may operate. However, it is important to note that the pseudo-code is presented merely for the sake of explanation herein, and that alternative pseudo-code may be formulated to achieve to same results. FIG. 7 illustrates example pseudo-code for declaring functions and structures in accordance with at least one embodiment of the present disclosure. Initially, declarations 700 define two functions. The Compare-And-Swap (CAS) function is an atomic operation that compares a variable in shared memory with a given value and if they match, it sets that shared variable to a new value and returns the original value of the shared variable and a Boolean true is returned. If the CAS fails, then the given value is set to the value of the variable in shared memory and a Boolean false is returned. CAS is equivalent to the "cmpxchg" instruction in the Intel architecture. Most architectures support both a single-wide CAS cmpxchg instruction and a double-wide CAS "cmpxchg8b/cmpxchg16b" instruction. The double-wide version can process a shared variable of the size of 2 pointers, however, to do this it uses more memory and operates slower than the single-wide CAS. The exchange (XCHG) function is an atomic operation to exchange values between 2 variables, and is also referred to as a "Fetch-And-Store" function. It is equivalent to the "xchg" instruction in the Intel architecture. Declarations 700 then proceed to define a node structure "Node_T" including at least a PTR "*pointer" and a CNT "counter" and a queue 100 including at least a tail "Node_T tail" and a head "Node_T head". The queue is then initialized wherein the head pointer and the tail pointer are set to point to the tail (e.g., setting queue 100 to an empty condition).

FIG. 8 illustrates example pseudo-code for a node-counter-based enqueue function in accordance with at least one embodiment of the present disclosure. Enqueue function 800 may initially increment the node counter and initialize the node pointer to the address of the tail in a new node prior to adding the new node to the queue using the instruction, "Node_T temp=XCHG(&q→tail, Node_T(Node, Node→counter))." Further to adding the new node, this statement also returns the current values in tail T into the temp node, which serves as a first observation point for the predecessor node. After the node has been added, the following pseudo-code sets a PRED associated with the newly added node, and compares the values in the predecessor node (e.g., PTR and CNT value) to the values previous set in the temp node with the instruction "If (!CAS(pred, &temp, Node_T (Node, temp.counter)))." If it is determined that the predecessor node has not changed, then the PTR of the predecessor node is set to point to the newly added node. Alternatively, if it is determined that the predecessor node has changed (e.g., has been dequeued), then the head H of queue 100 is changed to point at the newly added node since, in accordance with FIFO operation, the new node is at the head of queue 100.

At least one advantage of using a per-node counter (e.g., instead of a tail-counter) is that the per-node counter may be optimized if any given node won't be enqueued into more than one queue (e.g., or a fixed and small number of queues). Therefore, a counter of a single bit suffices in the case in which a node may be enqueued in one queue only. That's easy to be extended to N queues with N separate counters per node, one bit per counter. Given that N is a small number, all nodes may be aligned on a 2N-byte boundary, so that per-node counters may be encoded into unused address bits. Such optimization allows enqueuing to be done using an XCHG operation in place of a doublesize CAS operation. Experiments show that such optimization could result in a substantial (e.g., 10%-15%) overall queue throughput improvement. In practice, aligned nodes are common in I/O queues (e.g., Network/USB stacks), where the variant may be a good fit.

FIG. 9 illustrates example pseudo-code for a dequeue function in accordance with at least one embodiment of the present disclosure. Dequeue function 900 may initially read both the PTR and CNT of head H and may determine if the head is pointing to tail T or a member node. If determined to be pointing to tail T, the function may abort (e.g., since there are no nodes to dequeue). If determined to be pointing to a non-tail node, a new_head pointer may temporarily be established to and may be set to point to the position in queue 100 following the node to be removed. The head pointer may be set to Null (e.g., indicating that queue 100 is now empty). Alternatively, corrective action may be taken to resolve a situation where no nodes existed in the queue after dequeuing of the top-most node and/or if a new node gets added during dequeuing.

Figure 10:
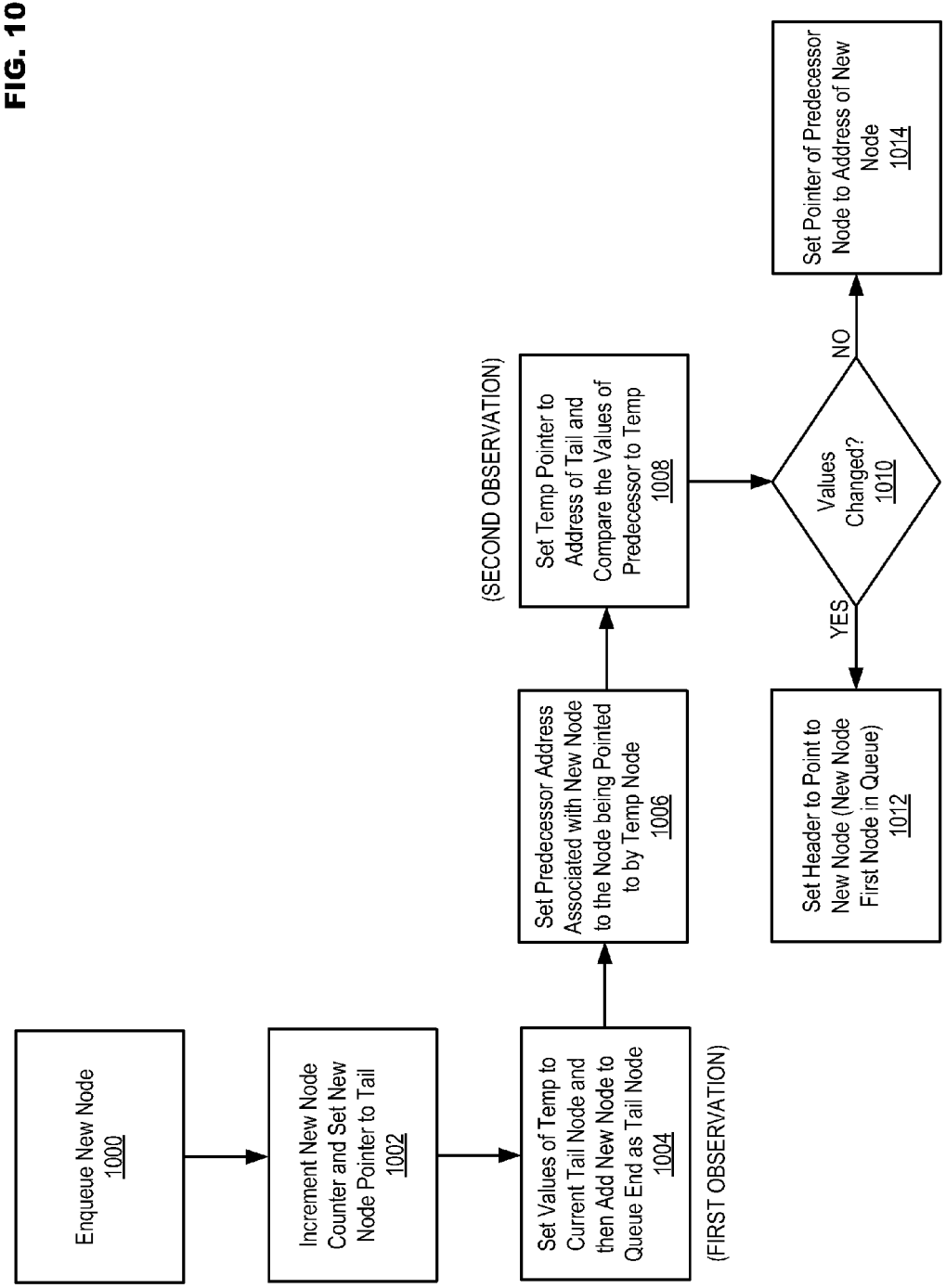
FIG. 10 illustrates example operations for enqueuing in a fast and scalable concurrent queuing system in accordance with at least one embodiment of the present disclosure.

FIG. 10 illustrates example operations for enqueuing in a fast and scalable concurrent queuing system in accordance with at least one embodiment of the present disclosure. In operation 1000 a determination may be made that there is a new node to enqueue to an existing queue. The counter of the new node may then be incremented and the pointer of the new node may be set to point to the tail (e.g., since the new node is being added to the end of the queue). In operation 1004 a first observation may occur. In particular, the values (e.g., pointer and counter) of temp may be set to the current values of the tail, and then the new node may be added to the end of the queue. A predecessor address associated with the new node may then be set to the address being pointed to by the temp node' pointer. A second observation may then occur in operation 1008. In particular, the temp node pointer may be set to the address of the tail, and the values in the predecessor node (e.g., the node whose address is now included in the predecessor associated with the newly added node) may then be compared to the values of the Temp node (e.g., to determine if the predecessor node has been dequeued while enqueuing the new node).

A determination may then be made in operation 1010 as to whether the values (e.g., at least the pointer and counter) of the predecessor node have changed. If it is determined in operation 1010 that the values of the predecessor node have changed, then in operation 1012 the pointer of the queue header may be set to point to the new node (e.g., the new node is now the first node in the queue). Alternatively, if it is determined in operation 1010 that the predecessor values have not changed, then in operation 1014 the pointer of the predecessor node may be set to point at the newly enqueued node. In at least one embodiment operations 1010 to 1014 may be performed as single/atomic operations FIG. 11 illustrates example operations for dequeuing in a fast and scalable concurrent queuing system in accordance with at least one embodiment of the present disclosure. In operation 1100 it may be determined that a node is to be dequeued from an existing queue. In operation 1102 the pointer and counter of the queue head may be read. A determination may then be made in operation 1104 as to whether the head is pointing at the tail of the queue. If it is determined that the head is pointing at the tail of the queue in operation 1104, then in operation 1106 dequeue operations may be ceased because there are no nodes exist in the queue to dequeue (e.g., the queue is empty). If in operation 1104 it is determined that the head is not pointing to the end of the queue, then in operation 1108 a new head pointer may be established and may be set to point to the next node in the queue (e.g., the node following the node to be dequeued). In operation 1110 the head pointer may be updated (e.g., corrective action may be taken) if, for example, the last node in the queue was removed from the queue by the dequeue operation, if at least one new node is added to the queue during the dequeue operation, etc.

While FIGS. 10 and 11 illustrate operations according to different embodiments, it is to be understood that not all of the operations depicted in FIGS. 10 and 11 are necessary for other embodiments. Indeed, it is fully contemplated herein that in other embodiments of the present disclosure, the operations depicted in FIGS. 10 and 11, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/ output (SDIO) cards, magnetic or optical cards, or any type of media suitable for storing electronic instructions. Other embodiments may be implemented as software modules executed by a programmable control device.

Thus, this disclosure is directed to a fast and scalable concurrent queuing system. A device may comprise, for example, at least a memory module and a processing module. The memory module may be to store a queue comprising at least a head and a tail. The processing module may be to execute at least one thread desiring to enqueue at least one new node to the queue, enqueue the at least one new node to the queue, a first state being observed based on information in the tail identifying a predecessor node when the at least one new node is enqueued, observe a second state based on the predecessor node, determine if the predecessor node has changed based on comparing the first state to the second state, and set ordering in the queue based on the determination.

The following examples pertain to further embodiments. In one example there is provided a device. The device may include a memory module to store a queue comprising at least a head and a tail and a processing module to execute at least one thread desiring to enqueue at least one new node to the queue, enqueue the at least one new node to the queue, a first state being observed based on information in the tail identifying a predecessor node when the at least one new node is enqueued, observe a second state based on the predecessor node, determine if the predecessor node has changed based on comparing the first state to the second state, and set ordering in the queue based on the determination.

The above example device may be further configured, wherein the head, tail and at least one new node each comprise at least a pointer and a one-bit node counter, the head pointer including the address of a node situated first in the queue, the tail pointer including the address of a node situated last in the queue, and the at least one new node pointer including the address of the tail. In this configuration the example device may be further configured, wherein the processing module is to increment the node counter of the at least one new node and to set the pointer of the at least one new node to the tail address. In this configuration the example device may be further configured, wherein in observing the first state, the processing module is to set the pointer and node counter in a temporary node equal to the tail pointer and tail node counter. In this configuration the example device may be further configured, wherein the processing module is to set a predecessor address associated with the at least one new node to the node indicated by the temporary node pointer. In this configuration the example device may be further configured, wherein in determining if the predecessor node has changed, the processing module is to compare at least the node pointer and node counter of the predecessor node to the node pointer and node counter of the temporary node. In this configuration the example device may be further configured, wherein in setting ordering in the queue, the processing module is to set the head pointer to the address of the at least one new node if it is determined that the node pointer and node counter for the predecessor node are different than the node pointer and node counter for the temporary node. In this configuration the example device may be further configured, wherein in setting ordering in the queue, the processing module is to set the pointer of the predecessor node to the address of the at least one new node if it is determined that the node pointer and node counter for predecessor node are the same as the node pointer and node counter for the temporary node. In this configuration the example device may be further configured, wherein the processing module is further to execute at least one thread desiring to dequeue a node from the queue, read the head pointer and head node counter, determine if the head pointer is pointing at the tail, set a new head pointer to point at the next node in the queue if it is determined that the head is not pointing at the tail, set the address of the head pointer equal to the address of the new head pointer, and take corrective action if the head pointer is pointing at the tail.

In another example there is provided a method. The method may include executing at least one thread desiring to enqueue at least one new node to a queue including at least a head and a tail, the head, tail and at least one new node each comprising at least a pointer and a one-bit node counter, the head pointer including the address of a node situated first in the queue, the tail pointer including the address of a node situated last in the queue, and the at least one new node pointer including the address of the tail, enqueuing the at least one new node to the queue, a first state being observed based on the tail pointer and tail counter when the at least one new node is enqueued, observing a second state based on the predecessor node, determining if the predecessor node has changed based on comparing the first state to the second state, and setting ordering in the queue based on the determination.

The above example method may further comprise incrementing the node counter of the at least one new node, and setting the pointer of the at least one new node to the tail address.

The above example method may be further configured, alone or in combination with the above further configurations, wherein observing the first state comprises setting the pointer and node counter in a temporary node equal to the tail pointer and tail node counter. In this configuration the example method may further comprise setting a predecessor address associated with the at least one new node to the node indicated by the temporary node pointer. In this configuration the example method may be further configured, wherein determining if the predecessor node has changed comprises comparing at least the node pointer and node counter of the predecessor node to the node pointer and node counter of the temporary node. In this configuration the example method may be further configured, wherein setting ordering in the queue comprises setting the head pointer to the address of the at least one new node if it is determined that the node pointer and node counter for the predecessor node are different than the node pointer and node counter for the temporary node. In this configuration the example method may be further configured, wherein setting ordering in the queue comprises setting the pointer of the predecessor node to the address of the at least one new node if it is determined that the node pointer and node counter for the predecessor node are the same as the node pointer and node counter for the temporary node.

The above example method may further comprise, alone or in combination with the above further configurations, executing at least one thread desiring to dequeue a node from the queue, reading the head pointer and head node counter, determining if the head pointer is pointing at the tail, setting a new head pointer to point at the next node in the queue if it is determined that the head is not pointing at the tail, setting the address of the head pointer equal to the address of the new head pointer, and taking corrective action if the head pointer is pointing at the tail.

In another example there is provided a system comprising at least a device, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured for use with a fast and scalable concurrent queuing system, the device being arranged to perform any of the above example methods.

In another example there is provided a device having means to perform any of the above example methods.

In another example there is provided a system comprising at least one machine-readable storage medium having stored thereon individually or in combination, instructions that when executed by one or more processors result in the system carrying out any of the above example methods In another example there is provided a device. The device may include a memory module to store a queue comprising at least a head and a tail and a processing module to execute at least one thread desiring to enqueue at least one new node to the queue, enqueue the at least one new node to the queue, a first state being observed based on information in the tail identifying a predecessor node when the at least one new node is enqueued, observe a second state based on the predecessor node, determine if the predecessor node has changed based on comparing the first state to the second state, and set ordering in the queue based on the determination.

The above example device may be further configured, wherein the head, tail and at least one new node each comprise at least a pointer and a one-bit node counter, the head pointer including the address of a node situated first in the queue, the tail pointer including the address of a node situated last in the queue, and the at least one new node pointer including the address of the tail. In this configuration the example device may be further configured, wherein in observing the first state, the processing module is to set the pointer and node counter in a temporary node equal to the tail pointer and tail node counter, and set a predecessor address associated with the at least one new node to the node indicated by the temporary node pointer. In this configuration the example device may be further configured, wherein in determining if the predecessor node has changed, the processing module is to compare at least the node pointer and node counter of the predecessor node to the node pointer and node counter of the temporary node. In this configuration the example device may be further configured, wherein in setting ordering in the queue, the processing module is to set the head pointer to the address of the at least one new node if it is determined that the node pointer and node counter for the predecessor node are different than the node pointer and node counter for the temporary node, and set the pointer of the predecessor node to the address of the at least one new node if it is determined that the node pointer and node counter for predecessor node are the same as the node pointer and node counter for the temporary node. In this configuration the example device may be further configured, wherein the processing module is further to execute at least one thread desiring to dequeue a node from the queue, read the head pointer and head node counter, determine if the head pointer is pointing at the tail, set a new head pointer to point at the next node in the queue if it is determined that the head is not pointing at the tail, set the address of the head pointer equal to the address of the new head pointer, and take corrective action if the head pointer is pointing at the tail.

In another example there is provided a method. The method may include executing at least one thread desiring to enqueue at least one new node to a queue including at least a head and a tail, the head, tail and at least one new node each comprising at least a pointer and a one-bit node counter, the head pointer including the address of a node situated first in the queue, the tail pointer including the address of a node situated last in the queue, and the at least one new node pointer including the address of the tail, enqueuing the at least one new node to the queue, a first state being observed based on the tail pointer and tail counter when the at least one new node is enqueued, observing a second state based on the predecessor node, determining if the predecessor node has changed based on comparing the first state to the second state, and setting ordering in the queue based on the determination.

The above example method may be further configured, wherein observing the first state comprises setting the pointer and node counter in a temporary node equal to the tail pointer and tail node counter, and setting a predecessor address associated with the at least one new node to the node indicated by the temporary node pointer. In this configuration the example method may be further configured, wherein determining if the predecessor node has changed comprises comparing at least the node pointer and node counter of the predecessor node to the node pointer and node counter of the temporary node. In this configuration the example method may be further configured, wherein setting ordering in the queue comprises setting the head pointer to the address of the at least one new node if it is determined that the node pointer and node counter for the predecessor node are different than the node pointer and node counter for the temporary node, and setting the pointer of the predecessor node to the address of the at least one new node if it is determined that the node pointer and node counter for the predecessor node are the same as the node pointer and node counter for the temporary node.

The above example method may further comprise, alone or in combination with the above further configurations, executing at least one thread desiring to dequeue a node from the queue, reading the head pointer and head node counter, determining if the head pointer is pointing at the tail, setting a new head pointer to point at the next node in the queue if it is determined that the head is not pointing at the tail, setting the address of the head pointer equal to the address of the new head pointer, and taking corrective action if the head pointer is pointing at the tail.

In another example there is provided a system comprising at least a device, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device having means to perform any of the above example methods.

In another example there is provided a device. The device may include a memory module to store a queue comprising at least a head and a tail and a processing module to execute at least one thread desiring to enqueue at least one new node to the queue, enqueue the at least one new node to the queue, a first state being observed based on information in the tail identifying a predecessor node when the at least one new node is enqueued, observe a second state based on the predecessor node, determine if the predecessor node has changed based on comparing the first state to the second state, and set ordering in the queue based on the determination.

The above example device may be further configured, wherein the head, tail and at least one new node each comprise at least a pointer and a one-bit node counter, the head pointer including the address of a node situated first in the queue, the tail pointer including the address of a node situated last in the queue, and the at least one new node pointer including the address of the tail. In this configuration the example device may be further configured, wherein the processing module is to increment the node counter of the at least one new node and to set the pointer of the at least one new node to the tail address. In this configuration the example device may be further configured, wherein in observing the first state, the processing module is to set the pointer and node counter in a temporary node equal to the tail pointer and tail node counter. In this configuration the example device may be further configured, wherein the processing module is to set a predecessor address associated with the at least one new node to the node indicated by the temporary node pointer. In this configuration the example device may be further configured, wherein in determining if the predecessor node has changed, the processing module is to compare at least the node pointer and node counter of the predecessor node to the node pointer and node counter of the temporary node. In this configuration the example device may be further configured, wherein in setting ordering in the queue, the processing module is to set the head pointer to the address of the at least one new node if it is determined that the node pointer and node counter for the predecessor node are different than the node pointer and node counter for the temporary node. In this configuration the example device may be further configured, wherein in setting ordering in the queue, the processing module is to set the pointer of the predecessor node to the address of the at least one new node if it is determined that the node pointer and node counter for predecessor node are the same as the node pointer and node counter for the temporary node. In this configuration the example device may be further configured, wherein the processing module is further to execute at least one thread desiring to dequeue a node from the queue, read the head pointer and head node counter, determine if the head pointer is pointing at the tail, set a new head pointer to point at the next node in the queue if it is determined that the head is not pointing at the tail, set the address of the head pointer equal to the address of the new head pointer, and take corrective action if the head pointer is pointing at the tail.

In another example there is provided a method. The method may include executing at least one thread desiring to enqueue at least one new node to a queue including at least a head and a tail, the head, tail and at least one new node each comprising at least a pointer and a one-bit node counter, the head pointer including the address of a node situated first in the queue, the tail pointer including the address of a node situated last in the queue, and the at least one new node pointer including the address of the tail, enqueuing the at least one new node to the queue, a first state being observed based on the tail pointer and tail counter when the at least one new node is enqueued, observing a second state based on the predecessor node, determining if the predecessor node has changed based on comparing the first state to the second state, and setting ordering in the queue based on the determination.

The above example method may further comprise incrementing the node counter of the at least one new node, and setting the pointer of the at least one new node to the tail address.

The above example method may be further configured, alone or in combination with the above further configurations, wherein observing the first state comprises setting the pointer and node counter in a temporary node equal to the tail pointer and tail node counter. In this configuration the example method may further comprise setting a predecessor address associated with the at least one new node to the node indicated by the temporary node pointer. In this configuration the example method may be further configured, wherein determining if the predecessor node has changed comprises comparing at least the node pointer and node counter of the predecessor node to the node pointer and node counter of the temporary node. In this configuration the example method may be further configured, wherein setting ordering in the queue comprises setting the head pointer to the address of the at least one new node if it is determined that the node pointer and node counter for the predecessor node are different than the node pointer and node counter for the temporary node. In this configuration the example method may be further configured, wherein setting ordering in the queue comprises setting the pointer of the predecessor node to the address of the at least one new node if it is determined that the node pointer and node counter for the predecessor node are the same as the node pointer and node counter for the temporary node.

The above example method may further comprise, alone or in combination with the above further configurations, executing at least one thread desiring to dequeue a node from the queue, reading the head pointer and head node counter, determining if the head pointer is pointing at the tail, setting a new head pointer to point at the next node in the queue if it is determined that the head is not pointing at the tail, setting the address of the head pointer equal to the address of the new head pointer, and taking corrective action if the head pointer is pointing at the tail.

In another example there is provided a system. The system may include means for executing at least one thread desiring to enqueue at least one new node to a queue including at least a head and a tail, the head, tail and at least one new node each comprising at least a pointer and a one-bit node counter, the head pointer including the address of a node situated first in the queue, the tail pointer including the address of a node situated last in the queue, and the at least one new node pointer including the address of the tail, means for enqueuing the at least one new node to the queue, a first state being observed based on the tail pointer and tail counter when the at least one new node is enqueued, means for observing a second state based on the predecessor node, means for determining if the predecessor node has changed based on comparing the first state to the second state, and means for setting ordering in the queue based on the determination.

The above example system may further comprise means for incrementing the node counter of the at least one new node, and means for setting the pointer of the at least one new node to the tail address.

The above example system may be further configured, alone or in combination with the above further configurations, wherein observing the first state comprises setting the pointer and node counter in a temporary node equal to the tail pointer and tail node counter. In this configuration the example system may further comprise means for setting a predecessor address in the at least one new node to the node indicated by the temporary node pointer. In this configuration the example system may be further configured, wherein determining if the predecessor node has changed comprises comparing at least the node pointer and node counter of the predecessor node to the node counter of the temporary node. In this configuration the example system may be further configured, wherein setting ordering in the queue comprises setting the head pointer to the address of the at least one new node if it is determined that the node pointer and node counter for the predecessor node are different than the node pointer and node pointer and node counter for the temporary node. In this configuration the example system may be further configured, wherein setting ordering in the queue comprises setting the pointer of the predecessor node to the address of the at least one new node if it is determined that the node pointer and node counter for the predecessor node are the same as the node pointer and node counter for the temporary node.

The above example system may further comprise, alone or in combination with the above further configurations, means for executing at least one thread desiring to dequeue a node from the queue, means for reading the head pointer and head node counter, means for determining if the head pointer is pointing at the tail, means for setting a new head pointer to point at the next node in the queue if it is determined that the head is not pointing at the tail, means for setting the address of the head pointer equal to the address of the new head pointer, and means for taking corrective action if the head pointer is pointing at the tail.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
a memory module to store a queue comprising at least a head and a tail; and
a processing module to:
execute at least one thread desiring to enqueue at least one new node to the queue;
enqueue the at least one new node to the queue, a first state being observed based on information in the tail identifying a predecessor node when the at least one new node is enqueued;
observe a second state based on the predecessor node;
determine if the predecessor node has changed based on comparing the first state to the second state;
set ordering in the queue based on the determination; and
wherein:
the head, tail and at least one new node each comprise at least a pointer and a one-bit node counter, the head pointer including the address of a node situated first in the queue, the tail pointer including the address of a node situated last in the queue, and the at least one new node pointer including the address of the tail; and
the processing module is further to:
execute at least one thread desiring to dequeue a node from the queue;
read the head pointer and head node counter;
determine if the head pointer is pointing at the tail;
set a new head pointer to point at the next node in the queue if it is determined that the head is not pointing at the tail;
set the address of the head pointer equal to the address of the new head pointer; and
take corrective action if the head pointer is pointing at the tail.

2. The device of claim 1, wherein the processing module is to increment the node counter of the at least one new node and to set the pointer of the at least one new node to the tail address.

3. The device of claim 1, wherein in observing the first state, the processing module is to set the pointer and node counter in a temporary node equal to the tail pointer and tail node counter.

4. The device of claim 3, wherein the processing module is to set a predecessor address associated with the at least one new node to the node indicated by the temporary node pointer.

5. The device of claim 4, wherein in determining if the predecessor node has changed, the processing module is to compare at least the node pointer and node counter of the predecessor node to the node pointer and node counter of the temporary node.

6. The device of claim 5, wherein in setting ordering in the queue, the processing module is to set the head pointer to the address of the at least one new node if it is determined that the node pointer and node counter for the predecessor node are different than the node pointer and node counter for the temporary node.

7. The device of claim 6, wherein in setting ordering in the queue, the processing module is to set the pointer of the predecessor node to the address of the at least one new node if it is determined that the node pointer and node counter for predecessor node are the same as the node pointer and node counter for the temporary node.

8. A method, comprising:
executing at least one thread desiring to enqueue at least one new node to a queue including at least a head and a tail, the head, tail and at least one new node each comprising at least a pointer and a one-bit node counter, the head pointer including the address of a node situated first in the queue, the tail pointer including the address of a node situated last in the queue, and the at least one new node pointer including the address of the tail;
enqueuing the at least one new node to the queue, a first state being observed based on the tail pointer and tail counter when the at least one new node is enqueued;
observing a second state based on the predecessor node;
determining if the predecessor node has changed based on comparing the first state to the second state;
setting ordering in the queue based on the determination;
executing at least one thread desiring to dequeue a node from the queue;
reading the head pointer and head node counter;
determining if the head pointer is pointing at the tail;
setting a new head pointer to point at the next node in the queue if it is determined that the head is not pointing at the tail;
setting the address of the head pointer equal to the address of the new head pointer; and
taking corrective action if the head pointer is pointing at the tail.

9. The method of claim 8, further comprising:
incrementing the node counter of the at least one new node; and
setting the pointer of the at least one new node to the tail address.

10. The method of claim 8, wherein observing the first state comprises setting the pointer and node counter in a temporary node equal to the tail pointer and tail node counter.

11. The method of claim 10, further comprising:
setting a predecessor address associated with the at least one new node to the node indicated by the temporary node pointer.

12. The method of claim 11, wherein determining if the predecessor node has changed comprises comparing at least the node pointer and node counter of the predecessor node to the node pointer and node counter of the temporary node.

13. The method of claim 12, wherein setting ordering in the queue comprises setting the head pointer to the address of the at least one new node if it is determined that the node pointer and node counter for the predecessor node are different than the node pointer and node counter for the temporary node.

14. The method of claim 13, wherein setting ordering in the queue comprises setting the pointer of the predecessor node to the address of the at least one new node if it is determined that the node pointer and node counter for the predecessor node are the same as the node pointer and node counter for the temporary node.

15. At least one machine-readable storage medium having stored thereon, individually or in combination, instructions that when executed by one or more processors result in the following operations comprising:
executing at least one thread desiring to enqueue at least one new node to a queue including at least a head and a tail, the head, tail and at least one new node each comprising at least a pointer and a one-bit node counter, the head pointer including the address of a node situated first in the queue, the tail pointer including the address of a node situated last in the queue, and the at least one new node pointer including the address of the tail;
enqueuing the at least one new node to the queue, a first state being observed based on the tail pointer and tail counter when the at least one new node is enqueued;
observing a second state based on the predecessor node;
determining if the predecessor node has changed based on comparing the first state to the second state;
setting ordering in the queue based on the determination;
executing at least one thread desiring to dequeue a node from the queue;
reading the head pointer and head node counter;
determining if the head pointer is pointing at the tail;
setting a new head pointer to point at the next node in the queue if it is determined that the head is not pointing at the tail;
setting the address of the head pointer equal to the address of the new head pointer; and
taking corrective action if the head pointer is pointing at the tail.

16. The medium of claim 15, further comprising instructions that when executed by one or more processors result in the following operations comprising:
incrementing the node counter of the at least one new node; and
setting the pointer of the at least one new node to the tail address.

17. The medium of claim 15, wherein observing the first state comprises setting the pointer and node counter in a temporary node equal to the tail pointer and tail node counter.

18. The medium of claim 17, further comprising instructions that when executed by one or more processors result in the following operations comprising:
setting a predecessor address in the at least one new node to the node indicated by the temporary node pointer.

19. The medium of claim 18, wherein determining if the predecessor node has changed comprises comparing at least the node pointer and node counter of the predecessor node to the node counter of the temporary node.

20. The medium of claim 19, wherein setting ordering in the queue comprises setting the head pointer to the address of the at least one new node if it is determined that the node pointer and node counter for the predecessor node are different than the node pointer and node pointer and node counter for the temporary node.

21. The medium of claim 20, wherein setting ordering in the queue comprises setting the pointer of the predecessor node to the address of the at least one new node if it is determined that the node pointer and node counter for the predecessor node are the same as the node pointer and node counter for the temporary node.

* * * * *